March 16, 1937. C. CARLISLE 2,074,101
DUMP TRAILER
Filed June 5, 1935 4 Sheets-Sheet 1
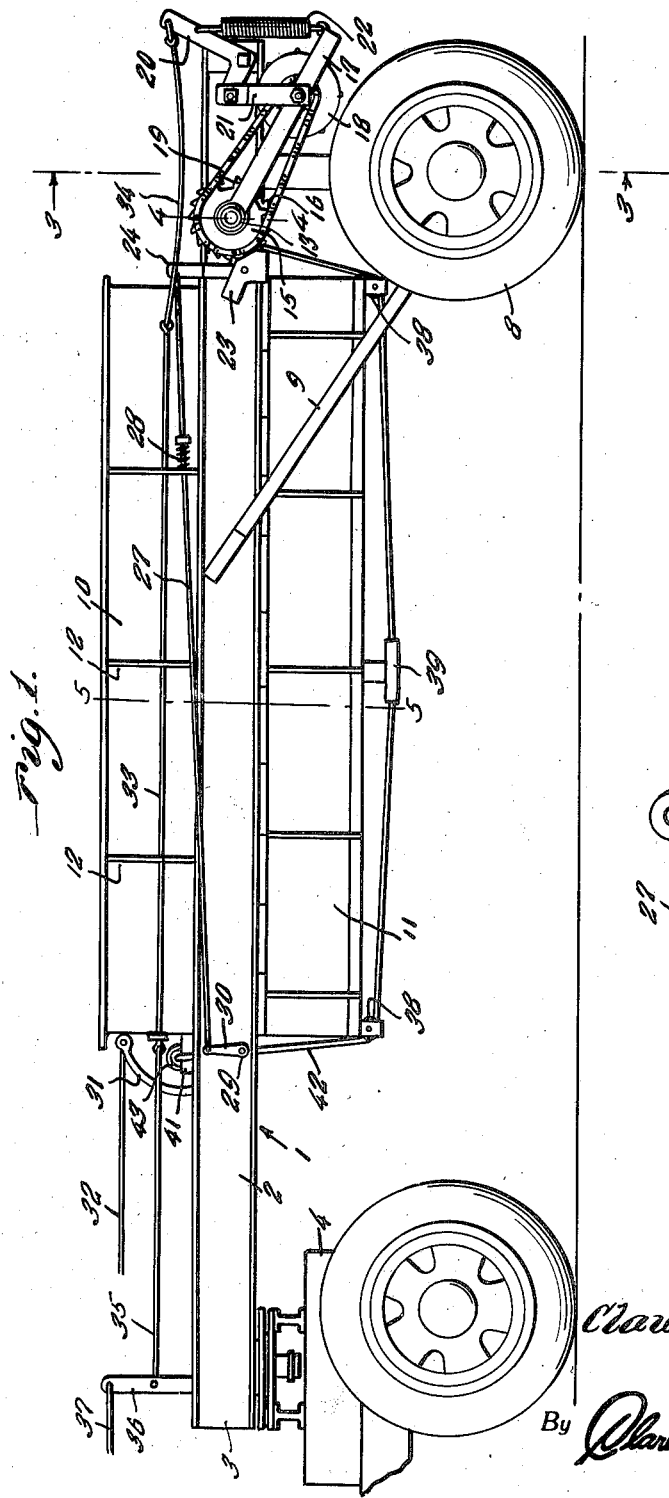
Inventor
Claud Carlisle
By Clarence A. O'Brien
Attorney March 16, 1937.                C. CARLISLE                2,074,101
                              DUMP TRAILER
                           Filed June 5, 1935            4 Sheets-Sheet 2
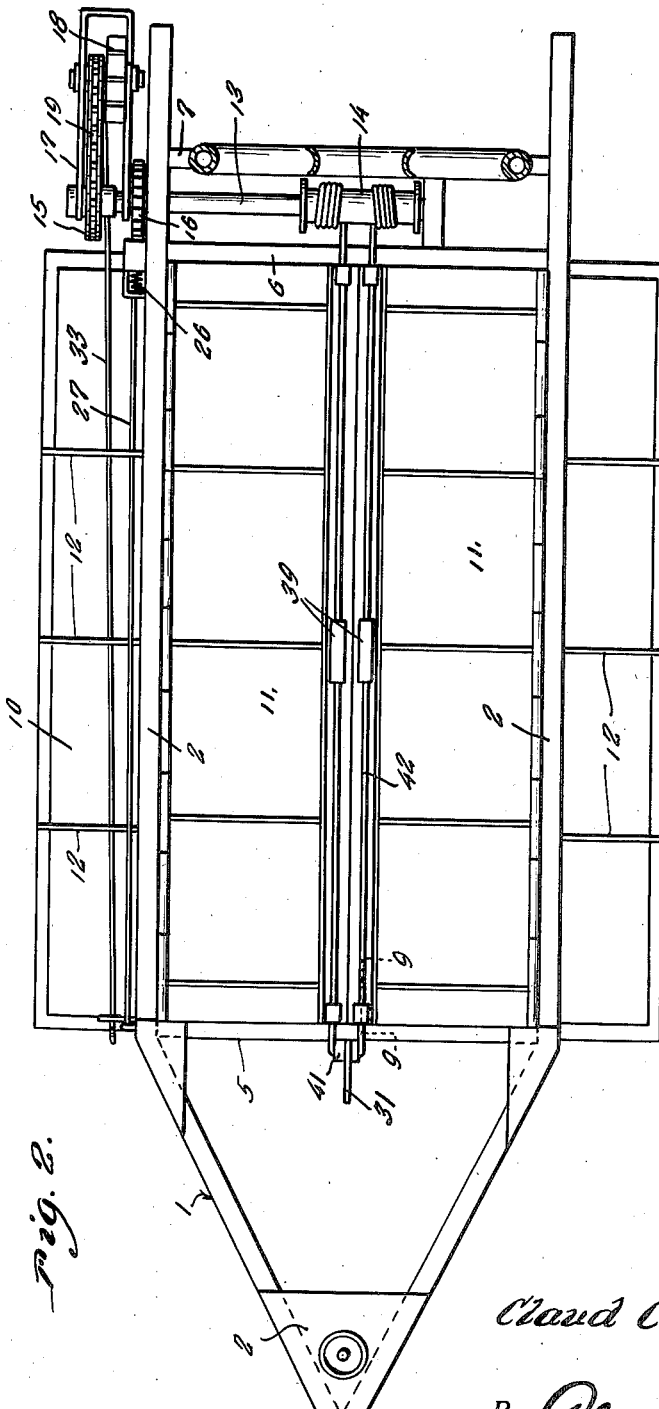
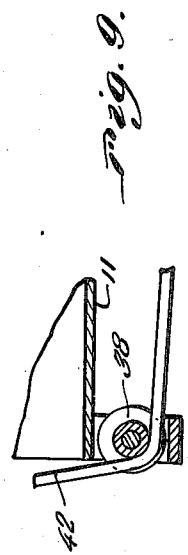
Inventor
Claud Carlisle
By Clarence A. O'Brien
Attorney

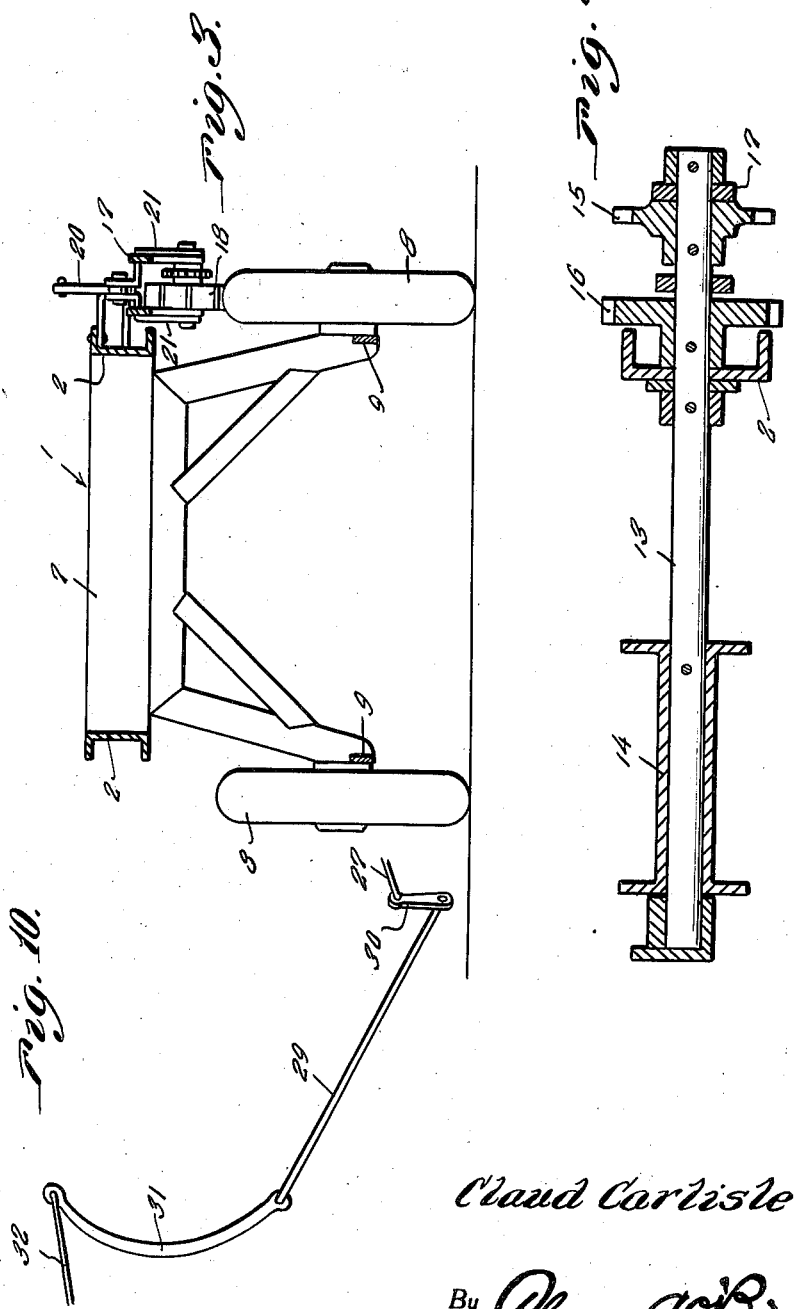

March 16, 1937. C. CARLISLE 2,074,101
DUMP TRAILER
Filed June 5, 1935 4 Sheets-Sheet 4
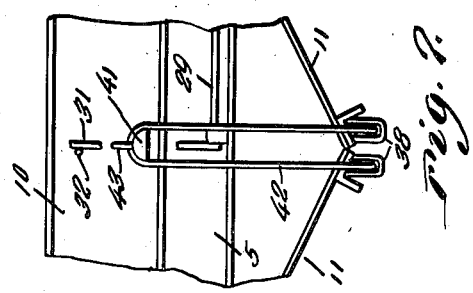
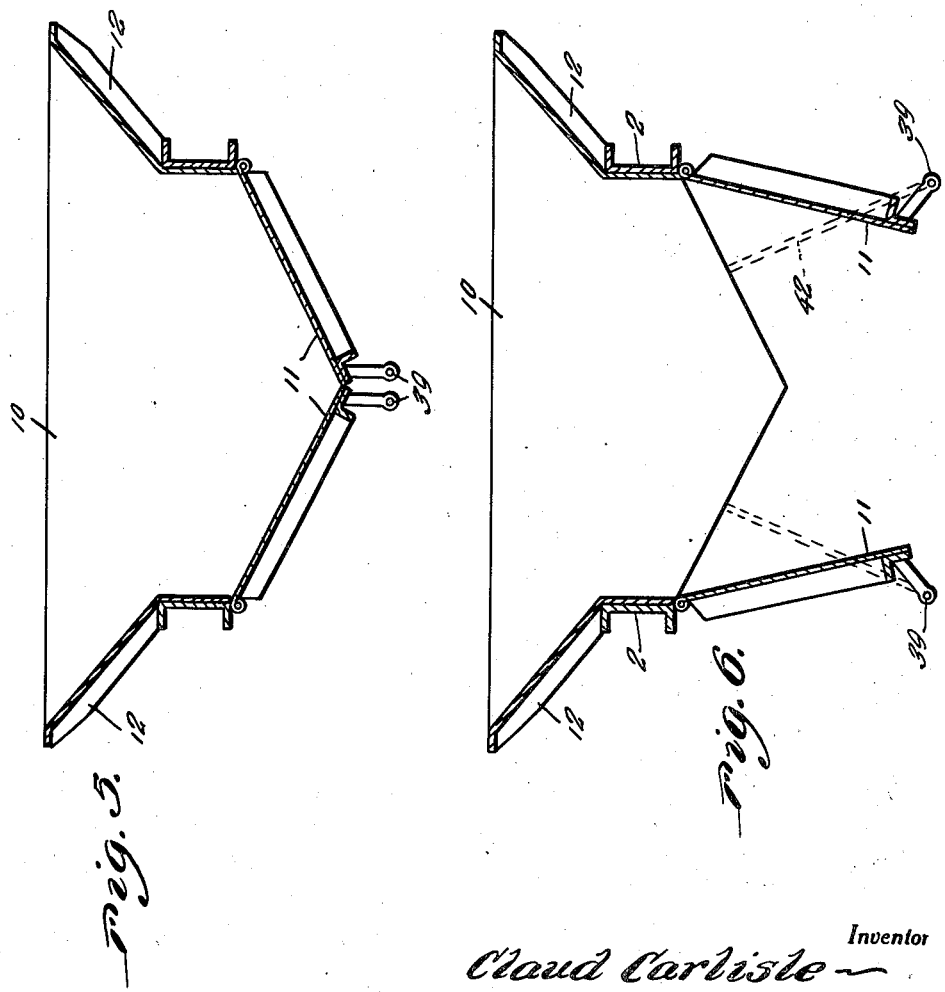
Inventor
Claud Carlisle
By Clarence A. O'Brien
Attorney Patented Mar. 16, 1937

2,074,101

UNITED STATES PATENT OFFICE 2,074,101

DUMP TRAILER

Claud Carlisle, Longview, Tex.

Application June 5, 1935, Serial No. 25,156

1 Claim. (Cl. 298—35)

The present invention relates to new and useful improvements in dump trailers of the type including a body having a bottom in the form of a pair of hinged doors, and has for one of its important objects to provide, in a manner as hereinafter set forth, a novel construction and arrangement whereby said doors may be controlled from the cab or operator's seat of the towing vehicle.

Another very important object of the invention is to provide, in a trailer of the aforementioned character, novel means for utilizing power from one of the wheels of said trailer for closing the doors.

Other objects of the invention are to provide a trailer of the character described which will be comparatively simple in construction, strong, durable, highly efficient and reliable in use, compact, light in weight and which may be manufactured at low cost.

All of the foregoing and still further objects and advantages of the invention will become apparent from a study of the following specification, taken in connection with the accompanying drawings wherein like characters of reference designate corresponding parts throughout the several views, and wherein:—

Figure 1 is a view in side elevation of a trailer constructed in accordance with the present invention.

Figure 2 is a view principally in bottom plan, the supporting wheels being omitted.

Figure 3 is a view in vertical transverse section, taken substantially on the line 3—3 of Figure 1.

Figure 4 is a view in vertical transverse section through the cable winding mechanism, taken substantially on the line 4—4 of Figure 1.

Figure 5 is a view in vertical transverse section through the invention, taken substantially on the line 5—5 of Figure 1.

Figure 6 is a sectional view similar to Figure 5 but showing the doors in open position.

Figure 7 is a fragmentary view in elevation, showing a portion of the forward end of the trailer body.

Figure 8 is a view in vertical longitudinal section, showing the means for releasably securing the doors in closed position.

Figure 9 is a detail view in vertical longitudinal section through a portion of one of the doors, taken substantially on the line 9—9 of Figure 2.

Figure 10 is a perspective view of a portion of the mechanism for releasing the dump doors.

Referring now to the drawings in detail, it will be seen that the embodiment of the invention which has been illustrated comprises a frame which is designated generally by the reference numeral 1, said frame including a pair of side members 2 which converge at their forward ends, as at 3, for connection to the rear end portion of a towing vehicle, as at 4. The frame 1 further includes a plurality of cross members 5, 6 and 7. Mounted beneath the cross member 7 at the rear end of the frame 1 is a pair of pneumatic tire equipped supporting wheels 8. The reference numeral 9 designates braces for the wheels 8.

Mounted between the side members 2 and the cross members 5 and 6 of the frame 1 is a substantially hopper-shaped body 10 the bottom of which is formed by a pair of complemental hinged doors 11. The inclined side walls of the body 10 are provided, on their outer surfaces, with strengthening ribs 12. The hinged doors 11 may be similarly reinforced, as best seen in Figures 5 and 6 of the drawings.

Mounted transversely in the frame 1, between the cross members 6 and 7 and projecting beyond one side of said frame, is a shaft 13 having fixed on its inner end portion a drum 14. Fixed on the outer end portion of the shaft 13 is a sprocket gear 15. Also fixed on the shaft 13, between the sprocket gear 15 and the adjacent side member 2 of the frame 1, is a ratchet wheel 16. A substantially U-shaped hanger 17 is mounted for swinging movement in a vertical plane on the outer end portion of the shaft 13, said hanger straddling the sprocket gear 15, as illustrated to advantage in Figure 4 of the drawings.

Journaled in the substantially U-shaped hanger 17 is a drive pulley 18 which is operatively engageable with the pneumatic tire of the adjacent supporting wheel 8. An endless chain 19 drives the sprocket gear 15 from the pulley 18. Pivotally mounted on the rear end portion of the adjacent side member 2 of the frame 1 is a bell crank lever 20 which is operatively connected to the substantially U-shaped hanger 17 by links 21. A coil spring 22 has one end connected to the bell crank lever 20 and its other end connected to the hanger 17 for returning the former to inoperative position and for lifting the latter in a manner to disengage the pulley 18, as shown to advantage in Figure 1 of the drawings.

Mounted for swinging movement in a bracket 23 on the frame 1 is a lever 24 which actuates a pawl 25, said pawl 25 being operatively engageable with the ratchet wheel 16. The pawl 25 is normally engaged with the ratchet wheel 16 by a spring 26. Pivotally connected to the lever 24 is a rod 27 which extends slidably through one or more of the strengthening ribs 12 on the adjacent side of the body 10. A coil spring 28 is operatively connected to the rod 27 for returning the lever 24 to inoperative position. Mounted transversely in the frame 1 adjacent the forward end of the body 10 is a rocker shaft 29 having fixed on its outer end an arm 30 to which the forward end of the rod 27 is pivotally connected. Fixed on the inner end of the rocker shaft 29 is a comparatively long, arcuate arm 31 to the free end portion of which a cable 32 is connected. The cable 32 is operable from the cab or operator's seat of the towing vehicle 4.

Also slidably mounted in the strengthening ribs 12 on one side of the body 10 is a rod 33 having its rear end connected to the bell crank lever 20 by a cable, chain or other suitable flexible element 34. A rod 35 connects the forward end of the rod 33 with an upstanding lever 36 which is mounted on the forward end portion 3 of the frame 1. The lever 36 is operable from the cab or operator's seat of the towing vehicle 4 through the medium of a suitable cable or the like 37.

Mounted on the end portions of the doors 11 are grooved pulleys 38. The reference numeral 39 designates guides which are mounted on intermediate portions of the doors 11. Projecting longitudinally from the forward end of the body 10 is a support 41 which, it will be noted, is substantially segmental in cross section. A cable 42 is slidably engaged over the support 41, said cable being trained under the pulleys 38 and passing slidably through the guides 39 of the doors 11 and having its end portions secured to the drum 14 for winding thereon. A loop 43 is provided for retaining the cable 42 on the support 41.

In operation, the doors 11 are supported in closed position by the cable 42, the end portions of which are wound on the drum 14, as best seen in Figure 2 of the drawings, said drum being retained against rotation by the pawl 25. When it is desired to empty the body 10, the lever 24 is actuated through the medium of the rod 27 to disengage the pawl 25 from the ratchet wheel 16, thus freeing the drum 14 and permitting the cable to unwind for allowing the doors 11 to swing by gravity to open position. To close the doors 11 as the trailer moves in a forward direction, the bell crank lever 20 is actuated to engage the pulley 18 with the adjacent supporting wheel 8 against the tension of the spring 22. The pulley 18 is thus frictionally driven and the shaft 13 is actuated through the chain 19 in a direction to wind the end portions of the cable 42 on the drum 14 for raising said doors 11 to closed position. The pawl 25 again functions to secure the doors in closed position. When the bell crank lever 20 is released the spring 22 raises the drive pulley 18 to disengaged or inoperative position.

It is believed that the many advantages of a dump trailer constructed in accordance with the present invention will be readily understood, and although a preferred embodiment of the invention is as illustrated and described, it is to be understood that changes in the details of construction and in the combination and arrangement of parts may be resorted to which will fall within the scope of the invention as claimed.

What is claimed is:—

A trailer of the class described comprising a frame, supporting wheels for said frame, a body mounted in said frame, said body including a pair of hinged bottom doors, a shaft journaled in said frame, a drum fixed on said shaft, a cable operatively connected to the doors and connected to said drum for winding thereon for actuating the doors to closed position and for securing said doors in closed position, a substantially U-shaped hanger mounted for swinging movement on the shaft, a pulley journaled in said hanger, means operatively connecting the shaft to said pulley for actuation thereby for winding the cable on the drum for closing the doors, means for releasably securing the shaft against retrograde rotation, and means for frictionally engaging the pulley with one of the wheels for actuation thereby, the last-named means including a bell crank lever pivotally mounted on the frame, links operatively connecting one end portion of said bell crank lever with the hanger for engaging the pulley with said one wheel when said bell crank lever is actuated in one direction, and a spring operatively connecting the other end portion of the bell crank lever to the hanger for actuating said bell crank lever in the opposite direction and for disengaging the pulley from said one wheel.

CLAUD CARLISLE.